UNITED STATES PATENT OFFICE.

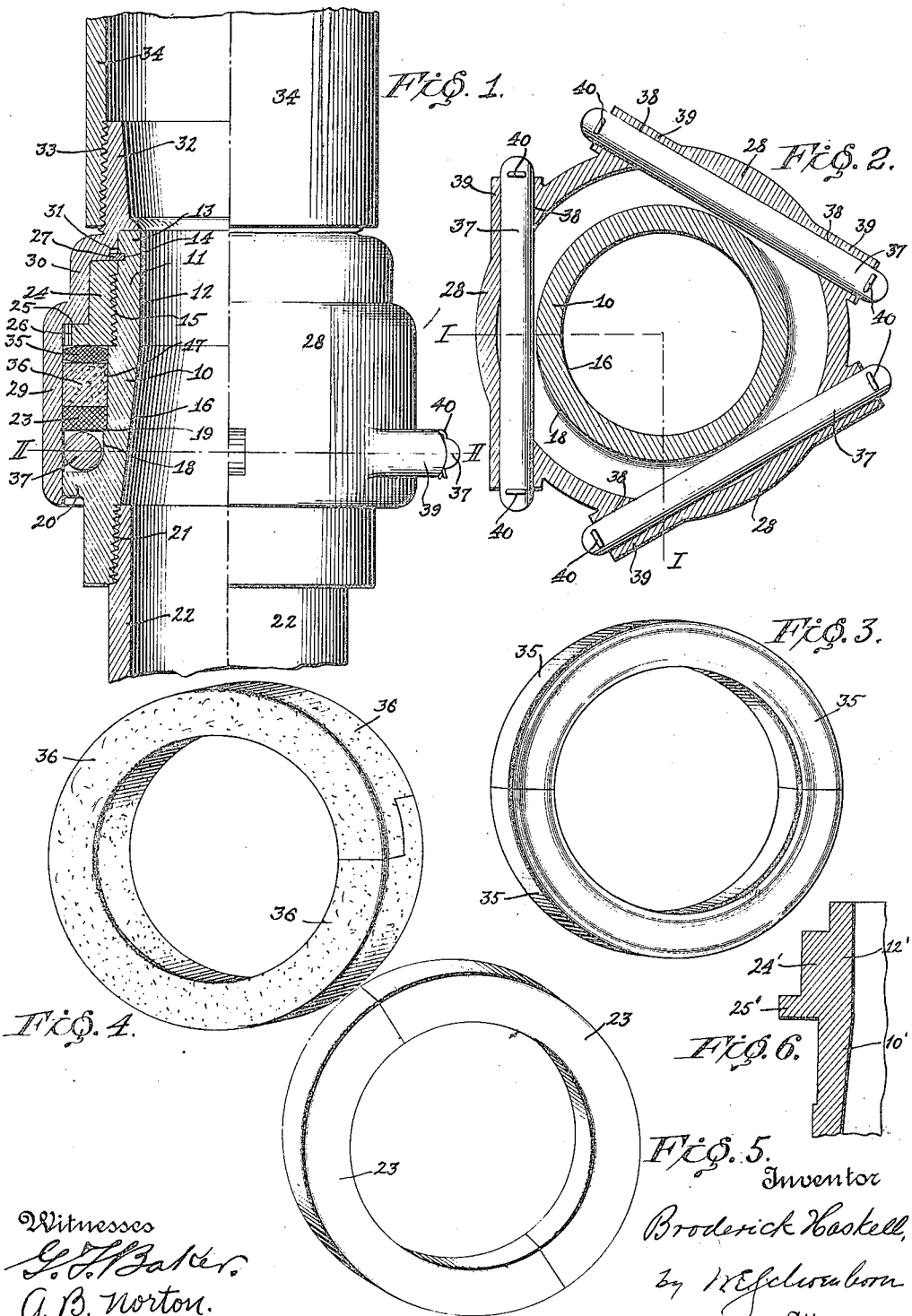

BRODERICK HASKELL, OF FRANKLIN, PENNSYLVANIA.

FLEXIBLE PIPE-COUPLING.

1,235,797.   Specification of Letters Patent.   Patented Aug. 7, 1917.

Application filed March 20, 1915. Serial No. 15,695.

*To all whom it may concern:*

Be it known that I, BRODERICK HASKELL, a citizen of the United States, residing at Franklin, in the county of Venango and State of Pennsylvania, have invented certain new and useful Improvements in Flexible Pipe-Couplings, of which the following is a specification.

This invention relates to pipe joints or couplings of the type wherein one section of the pipe may revolve with respect to the other section and which are known as swiveling joints.

One object of the invention is to provide an improved general construction for couplings or joints of this character.

A second object of the invention is to provide an improved arrangement of packing for use in connection with such a coupling or joint.

A third object of the invention is to provide means including a three-point support for locking the parts together so that they can move freely without disalinement.

A fourth object of the invention is to provide improved means whereby to take up wear on the packing.

With the above and other objects in view, as will be hereinafter described, the invention consists in general of certain novel details of construction and combinations of parts hereinafter fully described, illustrated in the accompanying drawings and specifically claimed.

In the accompanying drawings, like characters of reference indicate like parts in the several views, and:—

Figure 1 is a section on line 1—1 of Fig. 2, of a pipe joint or coupling constructed in accordance with this invention.

Fig. 2 is a section on the line 11—11 of Fig. 1.

Fig. 3 is a perspective view of a split ring employed in connection with the invention.

Fig. 4 is a perspective view of a compressible packing collar used therewith.

Fig. 5 is a perspective view of a second split ring used in connection with the packing collar above referred to.

Fig. 6 is a fragmentary and sectional view of a modified form of the inner member or nipple.

In carrying out the objects of this invention there is provided a nipple or body member which is indicated in general at 10.

This nipple or body member 10, in the form illustrated, has at one end a portion 11 which is provided with a cylindrical bore 12, the outer surface being cylindrical at its extremity as indicated at 13, this cylindrical portion being provided with a peripheral groove 14. The remainder of this portion is exteriorly threaded as at 15.

The central portion of this member is provided with a frusto-conical bore 16 and has two cylindrical exterior surfaces 17 and 18, the former being of lesser diameter than the latter, and being adjacent to the threaded portion 15, so that a shoulder 19 is formed which faces toward the threaded portion 15. On the larger end of this central portion is also found a peripheral rib 20 having a cylindrical outer surface.

The remaining portion of the member 10 is threaded interiorly as at 21, the threading being preferably of the type known as pipe threading, to receive a pipe section such as indicated at 22.

Fitted against the shoulder 19 is a divided ring 23, preferably made of metal such as steel or brass, or Babbitt metal or the like. Screwed on the threads 15 of the part 12 is a sleeve 24 having at the end adjacent the ring 35 a flange 25 provided with one or more notches 26 if so desired, so that a spanner wrench may be used to adjust the sleeve 24, on the nipple member 10. Fitted in the groove 14 is a split locking ring 27 against which the end of the sleeve 24 normally abuts.

Surrounding the nipple or body member 10 is a sleeve or outer member 28, consisting of an end portion 29 of such shape and having a base of such size as to fit snugly on the flange or rib 20 and the cylindrical end 13 of the nipple 10, while the central portion 30 of the sleeve or outer member 28 fits snugly on the sleeve 24 and is provided with a channel 31 to receive the ring 27. Furthermore, this outer or sleeve member 28, also has a second end portion 32, pipe threaded as at 33, for connection to a pipe section such as shown at 34.

Interposed between the flange 25 and lower split ring 23 engaging the shoulder 19 of the nipple 10, are certain packing rings 35 and 36, illustrated specifically in Figs. 3 and 4. The divided ring shown in Fig. 3 as 35 is placed next the flange 25, and is preferably made of anti-friction metal such as Babbitt metal or other material such as that of the divided ring 23, while the split collar 36, shown in Fig. 4 is preferably of some compressible packing such as fibrous or rubber material or the like.

The inner or nipple member 10 is held in the outer or sleeve member 28 by three retaining pins 37 preferably arranged as shown in Fig. 2 and corresponding to the sides of an equilateral triangle in a plane normal to the axis of the coupling sleeve 28 and nipple 10, said pins 37 passing through openings 38 bored through the lower end or portion 29 of the sleeve 28, and the sleeve extensions or bearings 39, which arrangement not only insure the holding of the sleeve 28 and nipple member 10 in a swiveled connection with a minimum of friction but also supporting the ring 23 into proper engagement and relation with the pins 37 and with the packing collar 36, said retaining pins 37 are of such a diameter as to properly abut against the sections of the divided ring 23, and by the arrangement of providing the divided rings 23 and 35 on each side of the packing collar 36, any decrease of size of the collar 36 owing to wear or compression due to pressure within the coupling will be quickly and automatically taken up by the permissible longitudinal movement of the nipple 10 with its attached sleeve 24, and ring 35 within the end portion 29 of the sleeve or outer member 28.

The pins 37 are held in position by cotters 40 inserted in openings at the ends of said pins as shown, said pins 37 forming a three-point bearing between the ring 23 and the sleeve or outer member 28, and while I have shown the ends of the pins 37, supported in the extensions 39 attached to the sleeve or outer member 28, the same could be readily omitted, if so desired, without departing from the spirit of the invention.

It is to be noted that the rings 23 and 35 are made in two parts so they can be readily assembled on the nipple member 10. Furthermore, by having the sleeve or flange 24 screwed on the upper section 11 of the nipple 10 and thereby securely hold the collar or gasket 36 between the rings 23 and 35 and the rings on the nipple 10, said nipple with its rings and collar or gasket can be properly inserted or applied into the sleeve member 28 without further separation or adjustment.

By means of this construction the various parts may be quickly applied, the ring 23 first being placed against the shoulder 19 on the nipple member 10, the split collar 35 and ring 36 next being placed in position, and the sleeve 24 screwed on and finally the ring 27 is inserted in its groove 14 and the outer or sleeve member 28 slipped over the nipple member 10, as shown in Fig. 1, after which the pins 37 are passed through the holes 38, as indicated in Fig. 2, when the sections 10 and 28 of the coupling will be held together and able to easily swivel upon each other at the three bearing points on the pins 37, and a simple and efficient fluid tight swiveled pipe coupling is produced which can be easily manufactured, inspected or repaired at a low cost.

It will be readily understood that instead of the inner member or nipple 10 being provided with screw threads 15 on section 12, which threads are engaged by a removable sleeve 24 having a flange 25, said sleeve 24 and flange 25 could be made integral with the inner member or nipple 10 as shown in fragmentary view in Fig. 6 in which the upper section 12′ of the modified form of nipple 10′ is provided with the integral sleeve 24′ and flange 25′. In this modified construction the split collar 36 and divided rings 23 and 35 can be easily and quickly applied to the nipple member, and it will be also seen, that when a removable sleeve 24 and flange 25 is employed as shown in Fig. 1 the said collar 36 and rings 23 and 35 could be applied to the nipple 10, although they are not split or divided as shown in Figs. 3, 4 and 5.

What I claim is:—

1. A flexible pipe coupling comprising an inner or nipple member provided with a lower, peripheral rib, an outer or sleeve member rotatable relative to the inner or nipple member, and a three-point combined locking and supporting means consisting of three removable pins passing through and carried by the outer or sleeve member in a single plane normal to the axis of the coupling and engaging the rib of the nipple member for rotatably and securely holding together at three separated points the outer member and the inner member and supporting the inner member within the outer member.

2. A flexible pipe coupling comprising an inner or nipple member carrying spaced rib and flange elements, compressible packing between said rib and flange elements, an outer or sleeve member revoluble on said elements, and removable pins arranged on the sides of an equilateral triangle whose plane is normal to the axis of the coupling and extending through and carried by the outer or sleeve member and engaged by the rib element.

3. A flexible pipe coupling comprising an inner or nipple member having a lower peripheral rib, an outer or sleeve member mounted on the inner member, one of said members being rotatable with respect to the other, the peripheral rib serving to hold said members in concentric spaced relation and combined supporting and locking means for rotatably securing said members together and supporting the inner member within the outer member including three locking pins extending through the walls of and carried by the outer or sleeve member and engaging the peripheral rib and having their sides substantially tangent to the inner wall of the outer or sleeve member, the prolonged axes of said pins constituting an equilateral triangle the plane of which is normal to the axis of the coupling.

4. A flexible pipe coupling comprising an inner or nipple member provided with a lower rib and an upper flange, separated metallic rings encircling said nipple member and interposed between the said rib and flange, compressible packing between said metallic rings, an outer or sleeve member revoluble on said nipple member and held for movement longitudinally of the inner or nipple member by said rib and flange and removable locking pins extending through the walls of and carried by the outer or sleeve member and arranged in a plane normal to the axis of the coupling.

5. A flexible pipe coupling comprising an inner or nipple member having a shoulder on the exterior thereof and provided with means for connection to a length of pipe, a ring resting on said shoulder, a sleeve screwed on the nipple member and provided at its inner end with a peripheral flange, packing rings mounted on and surrounding said inner or nipple member between the peripheral flange and the ring on the shoulder, one of said packing rings being of compressible material, an outer or sleeve member fitted over said sleeve screwed on the nipple member and the ring on the shoulder, and a series of pins lying in a plane normal to the axis of the coupling and extending through the wall of said outer or sleeve member beneath said ring on the shoulder.

In testimony whereof I affix my signature in presence of two witnesses.

BRODERICK HASKELL.

Witnesses:
CLYDE M. MILLER,
WM. E. ROSS.